United States Patent
Wei et al.

(10) Patent No.: US 11,500,787 B2
(45) Date of Patent: Nov. 15, 2022

(54) ENFORCING CODE INTEGRITY USING A TRUSTED COMPUTING BASE

(71) Applicant: VMware, Inc., Palo Alto, CA (US)

(72) Inventors: Michael Wei, Santa Clara, CA (US); Nadav Amit, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 217 days.

(21) Appl. No.: 16/519,616

(22) Filed: Jul. 23, 2019

(65) Prior Publication Data

US 2021/0026785 A1 Jan. 28, 2021

(51) Int. Cl.
*G06F 9/455* (2018.01)
*G06F 12/14* (2006.01)
*G06F 12/0882* (2016.01)
*G06F 21/12* (2013.01)
*G06F 21/54* (2013.01)

(52) U.S. Cl.
CPC ...... *G06F 12/1441* (2013.01); *G06F 9/45545* (2013.01); *G06F 9/45558* (2013.01); *G06F 12/0882* (2013.01); *G06F 21/126* (2013.01); *G06F 21/54* (2013.01); *G06F 2009/45583* (2013.01); *G06F 2009/45587* (2013.01); *G06F 2221/034* (2013.01)

(58) Field of Classification Search
CPC ............ G06F 12/1441; G06F 12/0882; G06F 21/126; G06F 21/54; G06F 9/45558; G06F 9/45545; G06F 2009/45583; G06F 2009/45587; G06F 2221/034
See application file for complete search history.

(56) References Cited

U.S. PATENT DOCUMENTS

| | | | | |
|---|---|---|---|---|
| 9,507,621 | B1* | 11/2016 | Allen | G06F 21/00 |
| 2015/0317178 | A1* | 11/2015 | Dang | G06F 21/00 |
| | | | | 718/1 |
| 2017/0329618 | A1* | 11/2017 | Tsirkin | G06F 8/65 |
| 2018/0060249 | A1* | 3/2018 | Tsirkin | G06F 9/445 |

* cited by examiner

*Primary Examiner* — Ernest Unelus

(57) ABSTRACT

One or more kernel-modifying procedures are stored in a trusted computing base (TCB) when bringing up a guest operating system (OS) on a virtual machine (VM) on a virtualization platform. When the guest OS invokes an OS-level kernel-modifying procedure, a call is made to the hypervisor. If the hypervisor determines the TCB to be valid, the kernel-modifying procedure in the TCB that corresponds to the OS-level kernel-modifying procedure is invoked so that the kernel code can be modified.

20 Claims, 10 Drawing Sheets

ENFORCING CODE INTEGRITY USING A TRUSTED COMPUTING BASE

BACKGROUND

Code integrity checks in an operating system are an important tool to ensure the kernel code has not been tampered with. Traditionally, these checks are performed using signatures, which are quick to verify. However, many security mechanisms such as kernel address space layout randomization (KASLR) and binary rewriting mechanisms interfere with the ability to perform accurate signature checks at runtime. Typically, these checks are performed at load-time. For example, the Unified Extensible Firmware Interface (UEFI) provides a secure boot process that verifies a boot loader signature when it is loaded. Integrity checks are usually not performed during runtime because the kernel code can change during runtime; for example by the operating system itself, resulting in false positives. Instead, anti-malware applications typically search for malicious code. While signature-based checking is effective at identifying known malware, it does not detect that code has been tampered with.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
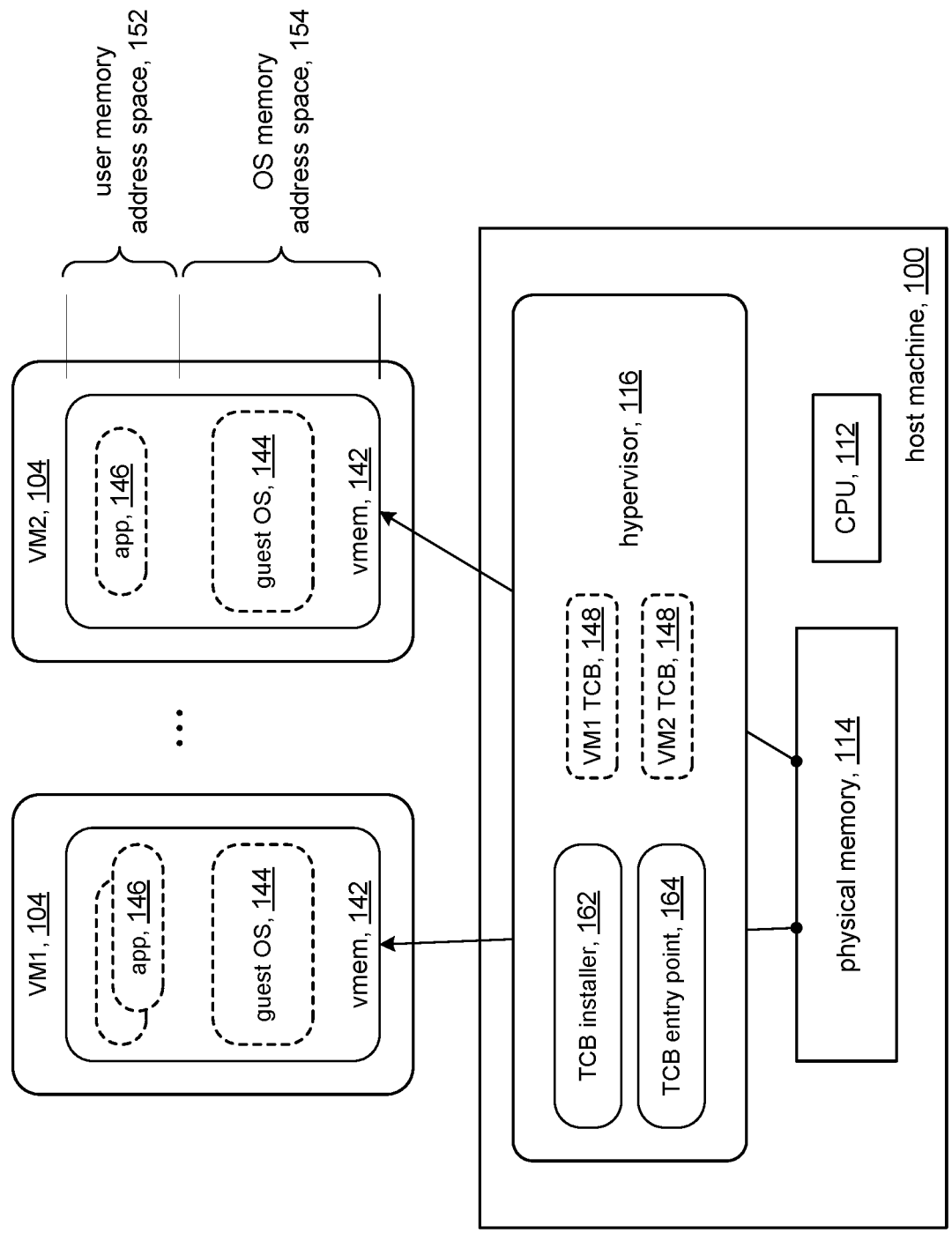
FIG. 1 is a high level representation of a host machine to support the execution of virtual machines in accordance with the present disclosure.

FIG. 1 shows an embodiment of a host machine 100 to host virtual machines (VMs) 104 in accordance with the present disclosure. In some embodiments, for example, the host machine 100 can include a central processing unit (CPU) 112 and physical memory 114. A hypervisor 116 executing on the host machine 100 can support the instantiation and execution of VMs 104. The physical memory 114 can back the respective virtual memories 142 of the VMs 104. Each VM 104 executes a guest operating system (OS) 144, which in turn supports the execution of one or more applications 146 on the VM.

The virtual memory 142 is typically partitioned into a user memory address space 152 and an OS memory address space 154. User applications execute in the user memory 152. The OS memory 154 contains executable OS program code (which can be collectively referred to variously as the kernel, kernel code, kernel procedures, procedures, etc.) and OS data structures.

In accordance with the present disclosure, one or more of the VMs 104 can maintain a trusted computing base (TCB) 148 to hold some of the procedures for of their respective guest OSs, and in particular kernel-modifying procedures. In accordance with the present disclosure, the hypervisor 116 can coordinate with VMs 104 to interact with their respective TCBs 148. These aspects of the present disclosure are discussed in more detail below.

Generally, a trusted computing base (TCB) refers to a computer system's hardware, firmware, and software components that combine/coordinate to provide the computer system with a secure environment. The TCB enforces security policies to ensure security of the system and its information. System safety is achieved by provisioning methods, like controlling access, requiring authorization to access specific resources, enforcing user authentication, safeguarding anti-malware and backing up data. In accordance with some embodiments of the present disclosure, the TCB 148 can be a region of memory in the guest OS 144 that is designated as read/execute only. The TCB 148 contents can be verified by the use of digital signatures. Aspects of the TCB 148 are discussed in more detail below.

A kernel-modifying procedure refers to executable program code that can modify the OS memory 154, including adding data to the OS memory, changing the values of data stored in the OS memory, deleting data, and so on. Kernel-modifying procedures include procedures that modify the executable program code comprising the guest OS 144, data tables (page tables, process tables, etc.) managed by the OS, and the like.

In some embodiments according to the present disclosure, the hypervisor 116 can include a TCB installer 162 that coordinates with the guest OS 144 of a VM 104 to set up the TCB 148 when a VM 104 boots up. Setting up the TCB 148 includes loading or otherwise storing the executable program code that comprise the kernel-modifying procedures. This aspect of the present disclosure is discussed in more detail below.

In some embodiments according to the present disclosure, the hypervisor 116 can include a TCB entry point module 164 that coordinates with the guest OS 144 of a VM 104 when the guest OS executes code that is directed to making modifications to the OS memory 154, and in particular to the kernel code. The TCB entry point module 164 can coordinate with the guest OS 144 to invoke an appropriate kernel-modifying procedure stored in the VM's corresponding TCB 148. This aspect of the present disclosure is discussed in more detail below.

Figure 2:
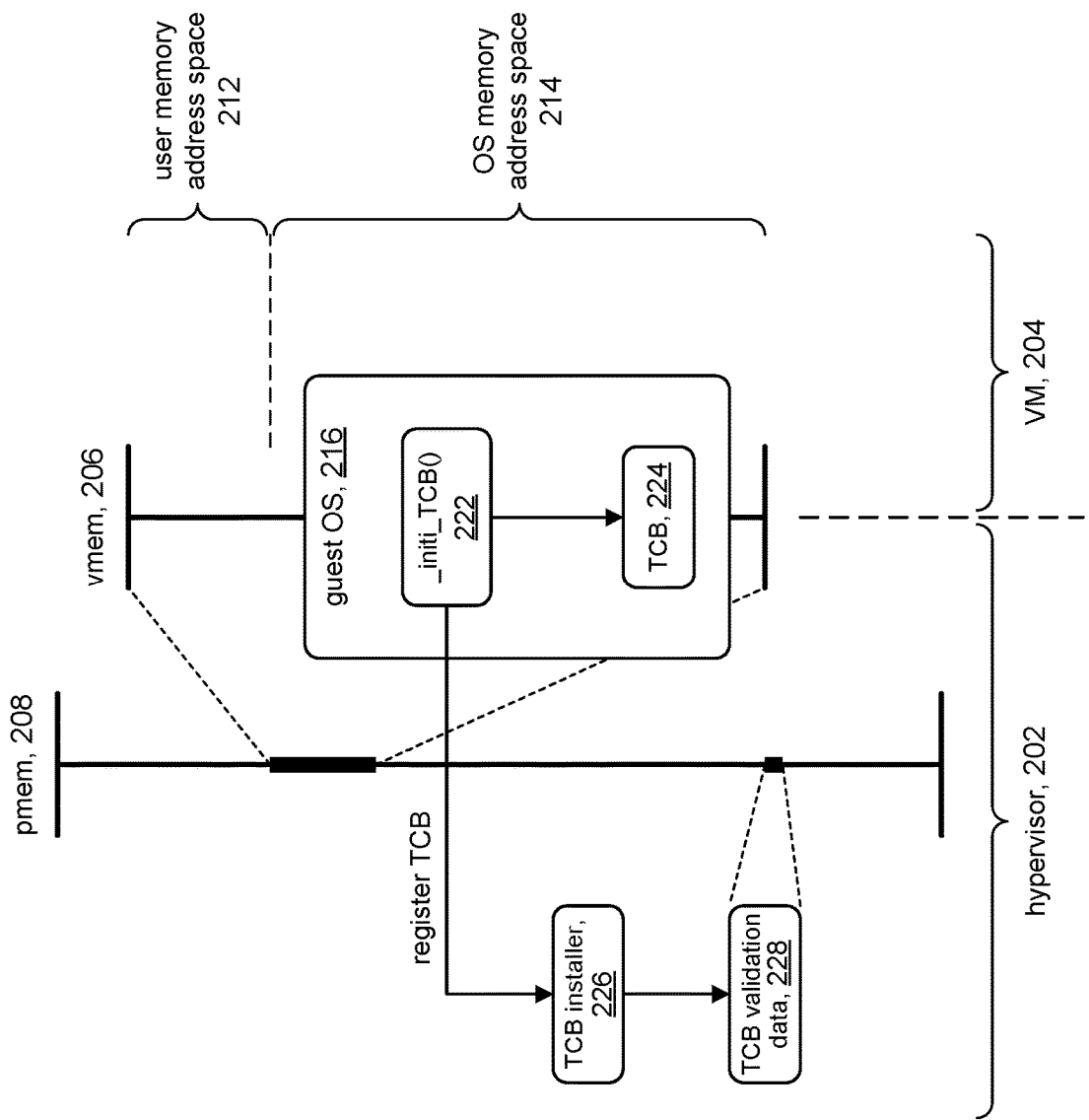
FIG. 2 represents the configuration of a trusted computing base in accordance with some embodiments of the present disclosure.
Figure 3:
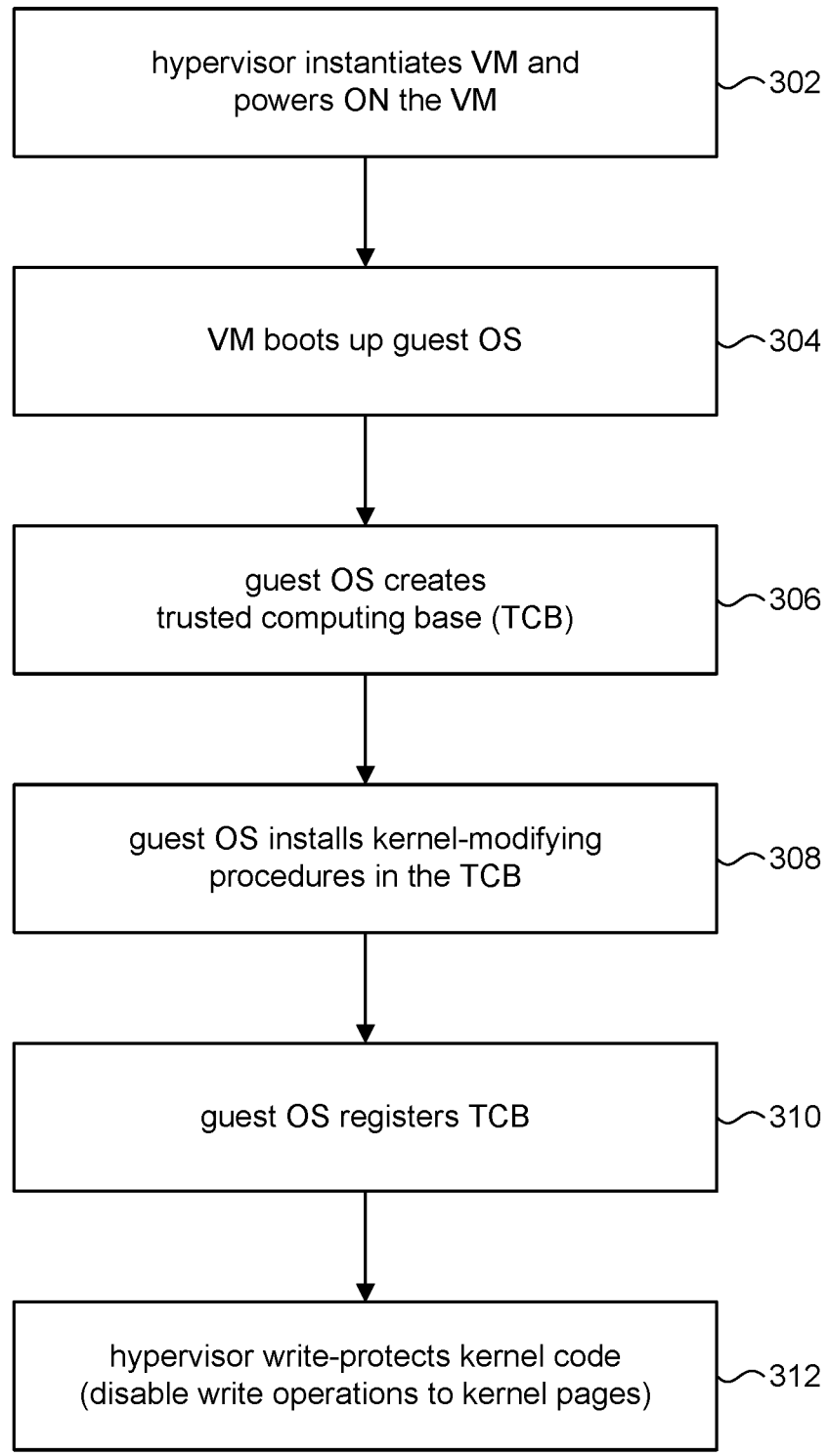
FIG. 3 highlights operations for installing a trusted computing base in accordance with some embodiments of the present disclosure.

Referring to FIGS. 2 and 3, the discussion will now turn to a description of installing a TCB for a guest OS in accordance with some embodiments of the present disclosure. The configuration shown in FIG. 2 will serve as an illustrative example to explain the process. FIG. 2 shows a hypervisor 202 and a VM 204 comprising virtual memory 206. The virtual memory 206 is allocated from memory pages (not necessarily contiguously) of host physical memory 208 and is accessible by hypervisor 202 as well as the VM. The virtual memory 206 is partitioned into a user memory address space 212 and an OS memory address space 214. A guest OS 216 executes in the OS address space. The guest OS 216 includes a TCB initialization module 222 and a TCB 224 that resides in the OS memory 214. A TCB installer 226 executes in the hypervisor 202. The hypervisor 202 includes a TCB validation data area 228.

Using FIG. 2 as an illustrative example, refer now to FIG. 3 for a high level description of processing to install TCB 224 in accordance with some embodiments of the present disclosure. In some embodiments, for example, a TCB can be installed as part of the process of bringing up, booting up, or otherwise starting operation of the guest OS on a VM. The processing includes interactions between the hypervisor 202, TCB installer 226, the VM 206, and the guest OS 216. In some embodiments, the hypervisor 202 can include computer executable program code, which when executed by a processor (e.g., 1012, FIG. 10), can cause the processor to perform processing in accordance with FIG. 3. The flow of operations performed by the processor is not necessarily limited to the order of operations shown.

At operation 302, the hypervisor 202 can instantiate a VM 204 on the host (e.g., host machine 100, FIG. 1), including allocating a portion of host physical memory 208 as the virtual memory 206 for the VM. The hypervisor 202 can then power ON the VM 204.

At operation 304, the VM 204 can begin the boot-up process upon being powered ON. The boot-up process leads to bringing up the guest OS 216.

At operation 306, the guest OS 216 can initialize its various data structures (e.g., memory page tables, process tables, etc.), including creating a TCB 224. In some embodiments, for example, the guest OS can include a TCB initialization module 222 that is executed during OS boot up. The TCB initialization module 222 can allocate memory for the TCB 224 from the portion of the address space of the virtual memory 206 designated as the OS memory 214.

At operation 308, the TCB initialization module 222 can install kernel-modifying procedures in the TCB 224. As used herein, a kernel-modifying procedure refers to executable program code that can modify executable code in the OS memory 214, including adding new executable code, modifying existing executable code, deleting executable code, and so on. In some embodiments, for example, the kernel-modifying procedures may be loaded from the operating system file(s) that store the executable program code and any related data the comprise the guest OS 216. In other embodiments, the kernel-modifying procedures may be obtained from a source other that the operating system files; e.g., a server system. The kernel-modifying procedures can include procedures that install user-provided modules into the guest OS, self-modifying code (e.g., such a kernel optimizer that optimizes code at runtime), or new kernel techniques which self modify code to obfuscate for security, and the like.

At operation 310, the TCB initialization module 222 can register the TCB 224 with the hypervisor 202 via the TCB installer 226. In some embodiments, the TCB initialization module 222 can authenticate the TCB 224. Digital signatures based on public key/private key encryption is a known authentication method and will be used as an example, although any other suitable authentication method can be used. In some embodiments, for example, the TCB initialization module 222 can digitally sign the TCB 224. In some embodiments, the entire TCB 224 can be signed to produce a single digital signature, and in other embodiments each procedure that is installed in the TCB can be individually signed to produce corresponding individual digital signatures. Registration can include providing to the TCB installer 226 an address of the location of the TCB 224 in the OS address space of the guest OS 216, along with one (or more) digital signatures and corresponding public key(s).

The TCB initialization module 222 can further provide an index of the procedures stored in the TCB 224 to the TCB installer 226. In some embodiments, for example, each procedure can be identified by an offset relative to the beginning of the TCB that indicates where the first instruction of each procedure begins. See, for example, the illustrative TCB shown in FIG. 4 which shows three kernel-modifying procedures and their corresponding offset values in the TCB. The TCB installer 226 can store the information received from the TCB initialization module 222 in a TCB validation data structure 228 that is maintained in the hypervisor 202.

At operation 312, the hypervisor 202 can write-protect the portion of OS memory 214 that stores the program code (kernel code) comprising the guest OS 216. In some embodiments, for example, the hypervisor 202 can mark the physical memory pages of physical memory 208 that are associated with VM 202 and which contain the guest OS program code (kernel pages) as being read- and execute-only. In some embodiments, those kernel pages can be marked execute-only. At this point, the VM 204 can be deemed ready for operation; e.g., user(s) can log on, user-level applications (e.g., database systems, etc.) can be loaded, and so on.

Figure 5:
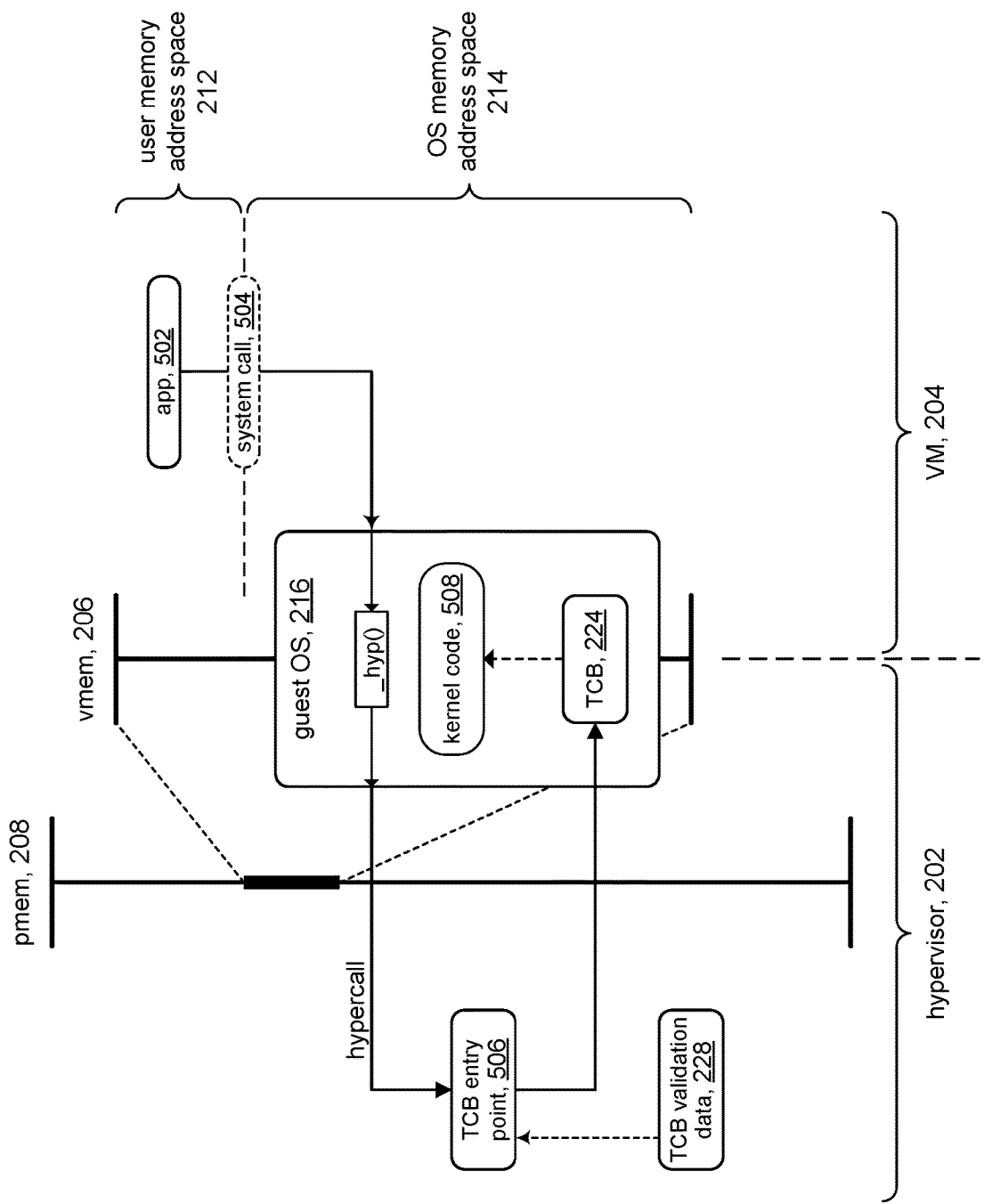
FIG. 5 represents the configuration of a trusted computing base in accordance with some embodiments of the present disclosure.
Figure 6:
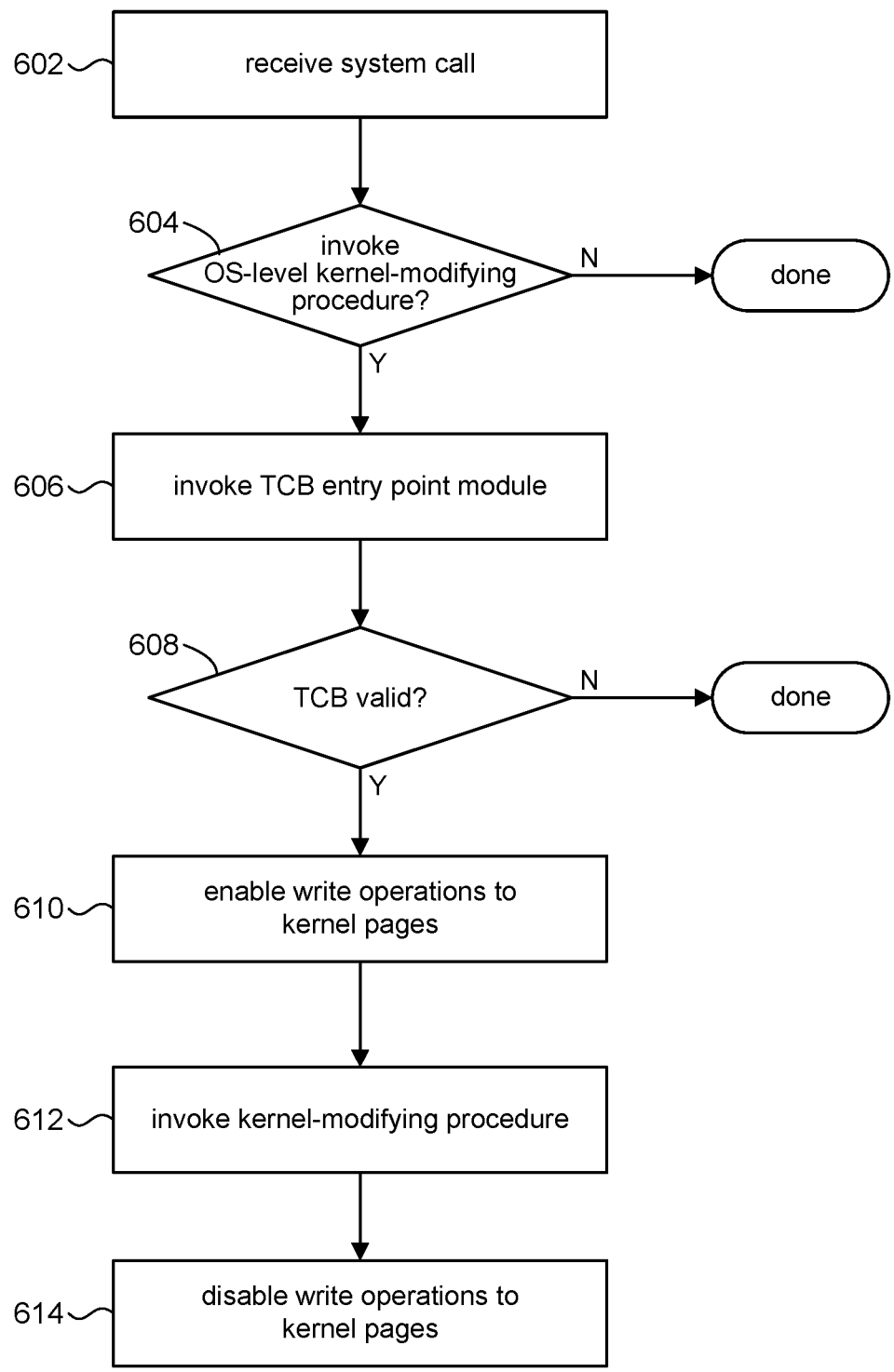
FIG. 6 highlights operations for using a trusted computing base in accordance with some embodiments of the present disclosure.

Referring to FIGS. 5 and 6, the discussion will now turn to a description of invoking procedures stored in the TCB of a guest OS in accordance with the present disclosure. The configuration shown in FIG. 5 will serve as an illustrative example to explain the process. FIG. 5 continues the example of FIG. 2 where the TCB 224 is now initialized and registered. FIG. 5 shows a user-level application 502 executing in the user space 212 of VM 204, and a system call 504 to the guest OS 216 made by the application. The hypervisor 202 includes a TCB entry point module 506.

Using FIG. 5 as an illustrative example, refer now to FIG. 6 for a high level description of processing to invoke a kernel-modifying procedure that is installed in TCB 224 in accordance with the present disclosure. In some embodiments, the processing includes interactions between the VM 206, the guest OS 216, and TCB entry point module 506. In some embodiments, the hypervisor 202 can include computer executable program code, which when executed by a processor (e.g., 1012, FIG. 10), can cause the processor to perform processing in accordance with FIG. 6. The flow of operations performed by the processor is not necessarily limited to the order of operations shown.

At operation 602, the guest OS 216 can receive a system call from application 502. A system call is a request for the guest OS 216 to do something on behalf of the application. The system call typically invokes functions/procedures that comprise the kernel of the guest OS.

At operation 604, the guest OS 216 can invoke a kernel-modifying procedure. For purposes of discussion, suppose the system call 504 includes code intended to modify one or more memory locations 508 in the OS memory space 214 that contain kernel code. For example, a system call might be to install a module in the guest OS 216. As the guest OS 216 executes the code that comprises the system call 504, the guest OS may encounter a call to an OS-level kernel-modifying procedure contained in the code. The relevance of the qualifier "OS-level" is explained below.

It is noted that in other circumstances, OS-level kernel-modifying procedures can be invoked from within the guest OS 216, without being initiated by a system call from the application. For example, the guest OS 216 may include optimizing procedures that can modify the kernel code at runtime to optimize performance. Such procedures would not be invoked by the user-level application 502.

At operation 606, the guest OS 216 can invoke the TCB entry point module 506. For example, when the guest OS encounters a call to an OS-level kernel-modifying procedure, the guest OS will invoke the OS-level kernel-modifying procedure. However, in accordance with some embodiments of the present disclosure, the OS-level kernel-modifying procedure can be stubbed out with a hypervisor call (hyper call), which is an invocation of a function in the hypervisor 202, in place of the actual code that modifies the kernel. Processing the hyper call can include invoking the TCB entry point module 506 in the hypervisor 202.

Figure 7:
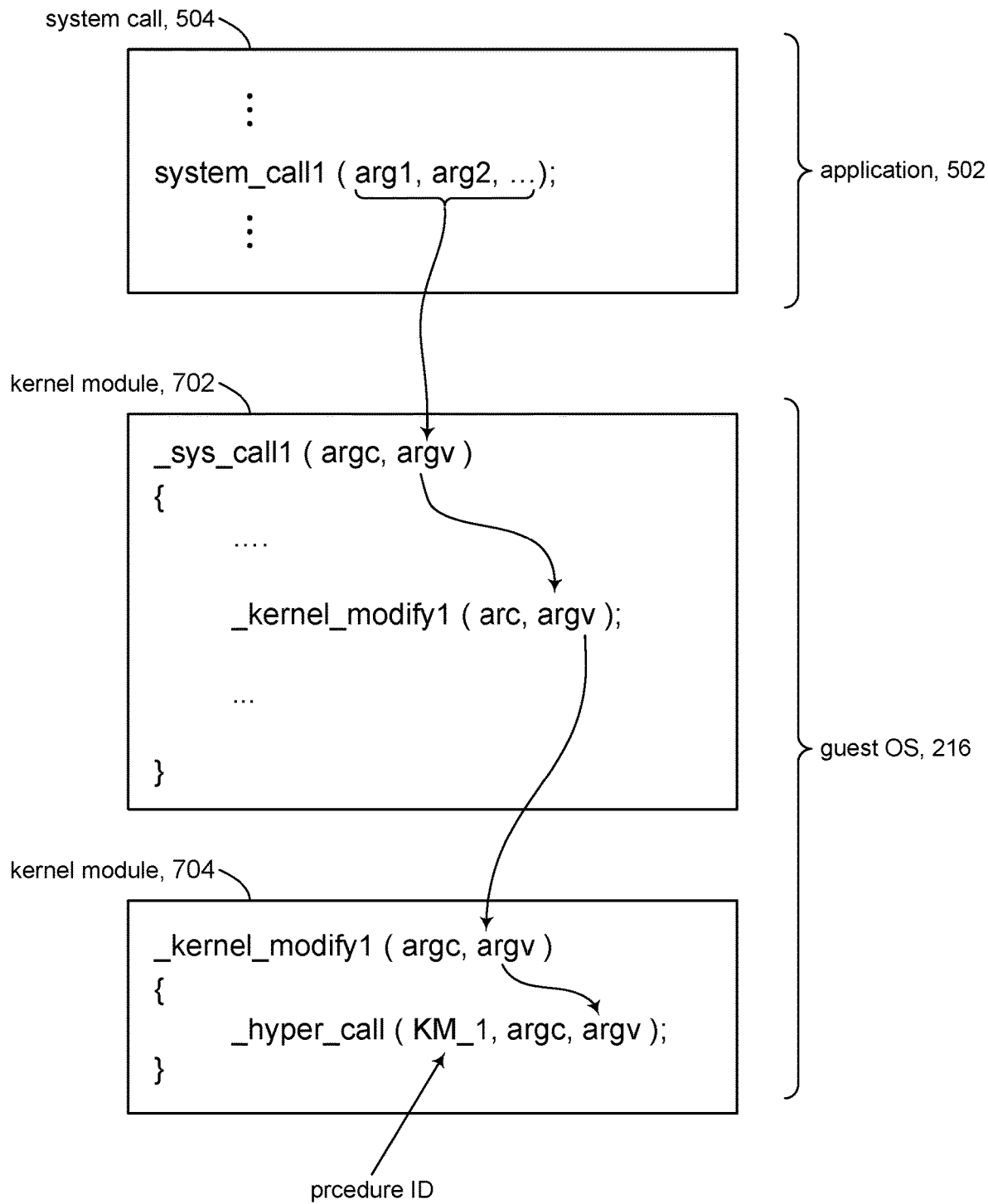
FIG. 7 illustrate an invocation sequence in accordance with some embodiments of the present disclosure.

Refer for a moment to FIG. 7, which illustrates using C language-like pseudo-code the sequence of invocations from the system call 504 (made by the application 502) to the hyper call made by the guest OS 216. Kernel module 702 represents the kernel procedure _sys_call1( ) that corresponds to the system call 504. The kernel procedure _sys_call1( ) can include a call to an OS-level kernel-modifying procedure called _kernel_modify1( ).

Kernel module 704 represents the executable code for _kernel_modify1( ). FIG. 7 shows that _kernel_modify1( ) is stubbed out; it contains no actual code related to modifying the kernel, but instead contains a hyper call to the hypervisor 202 via _hyper_call( ). As will be explained below, the hyper call will lead to executing the actual code in the TCB 224 that corresponds to _kernel_modify1( ); it is the code in the TCB that actually modifies the kernel. For this reason, the kernel-modifying procedure _kernel_modify1( ) can be referred to as an "OS-level" kernel-modifying procedure to distinguish from the procedure stored in the TCB 224 which contains the actual kernel-modifying code. The _kernel_modify1( ) procedure can be viewed as a procedure that is directed to modify kernel code, but itself does not contain the actual code that modifies the kernel code.

FIG. 7 further illustrates how the arguments in the system call 504 can be passed down to the hyper call routine in the kernel module 704, using the argc and argv argument passing conventions of the C programming language. In addition, in accordance with some embodiments, the hyper call routine can include a procedure identifier (ID) that is associated with an OS-level kernel-modifying procedure. The procedure ID can serve to identify a procedure in the TCB 522 that corresponds to the OS-level kernel-modifying procedure. In the example shown in FIG. 7, for instance, procedure ID KM_1 identifies a procedure stored in TCB 522 that corresponds to _kernel_modify1( ). In some embodiments, for example, the procedure ID may be an offset value in the TCB 522; refer to the TCB offset values in FIG. 4.

Continuing with FIG. 6, at operation 608, the TCB entry point module 506 can determine whether the TCB 224 is valid or not. In some embodiments, for example, the TCB entry point module 506 can use the digital signature stored in the TCB validation data 228 (operation 310, FIG. 3) to validate the TCB 224. For example, if the digital signature is based on public key/private key encryption, the TCB validation data 228 may store a digital signature of the TCB and a public key counterpart of the private key that was used to generate the digital signature. The public key can be applied to the digital signature to produce a decrypted output; the decrypted output can be compared to the contents of the TCB 224 to confirm whether the TCB has been tampered with. If the TCB 224 has not been tampered with then its contents will match the decrypted output and the TCB can be deemed to be valid; processing can continue to operation 610, otherwise processing in the TCB entry point module 506 can deemed complete.

At operation 610, the TCB entry point module 506 can enable write operations to the kernel pages, namely pages in physical memory 208 associated with the VM 202 that contain the kernel code of guest OS 216. This reverses the write-protection applied to the kernel pages at operation 312 in FIG. 3 performed as part of bringing up the VM 202. In some embodiments, the memory pages can be marked with protection bits (e.g., read, write, execute), which can be set to enable write operations. In other embodiments, the CPU may have different operating modes (e.g., user mode, kernel mode, etc.), which can be selected to enable write operations.

At operation 612, the TCB entry point module 506 can invoke the kernel-modifying procedure in the TCB 224 that corresponds to the OS-level kernel-modifying procedure invoked in the system call 504 (reference FIG. 7). In some embodiments, for example, the TCB entry point module 506 can use the procedure identifier that is passed in the hyper call routine to index into the TCB 224 to find the beginning of the executable code comprising the kernel-modifying procedure. The TCB entry point module 506 can transfer control to the executable code, thus invoking the kernel-modifying procedure. Execution of the invoked kernel-modifying procedure may include modifying kernel code stored in the OS memory 214.

Figure 4:
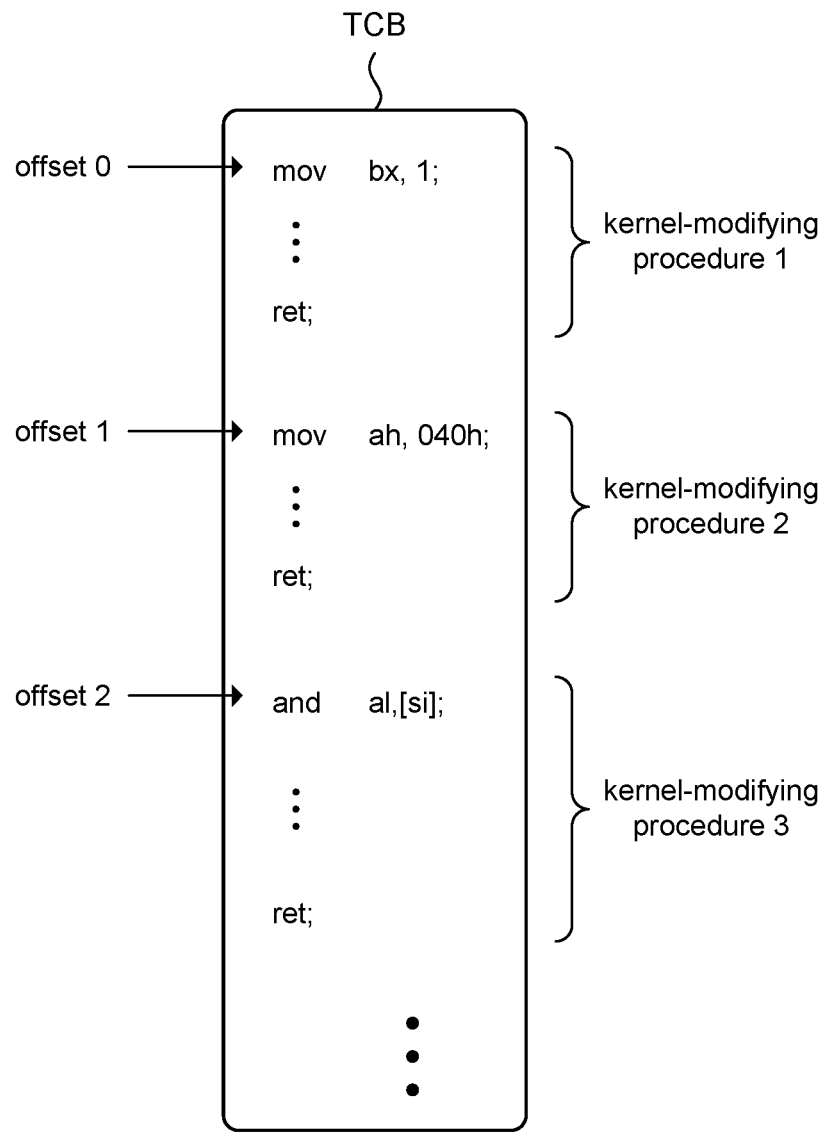
FIG. 4 represents an example of a trusted computing base in accordance with some embodiments of the present disclosure.

At operation 614, the TCB entry point module 506 can disable write operations to the kernel pages upon completion of the kernel-modifying procedure. Referring for a moment to FIG. 4, for example, each of the kernel-modifying procedures installed in the TCB 224 can include a return statement. When the invoked kernel-modifying procedure hits the return statement, control can be transferred back to the TCB entry point module 506. The TCB entry point module can then set protection bits in the kernel pages to once again disable write operations to the kernel pages, thus restoring the protection state of the kernel pages prior to executing the kernel-modifying procedure. Control can then be returned to the hyper call routine and so on back to the system call 504 and finally to the application 502 that made the system call.

Referring back for a moment to operation 608, when the TCB is deemed to be not valid, processing in the TCB entry point module 506 can terminate without executing any code in the TCB 224. With respect to the example in FIG. 7, control can return to the hyper call routine in kernel module 704 without the hypervisor 202 having invoked the TCB at all. The hyper call, in turn, returns control back to system code in kernel module 702 and then back to the system call 504. In some embodiments, the TCB entry point module 506 can be configured to report (e.g., to a system console on the host machine) that an invalid TCB has been detected. In some embodiments, the TCB entry point module 506 can report every access to the TCB.

In some embodiments according to the present disclosure, all kernel-modifying procedures in the guest OS 216 can be installed in the TCB 224 and accessed via the TCB entry point module 506. Attacks to the guest OS 216 that target the kernel-modifying procedures in the TCB can therefore be detected. Suppose, for example, a kernel-modifying procedure includes code that verifies whether the user of the system call 504 is "root" (e.g., a superuser). An attack that disables the verification code in the kernel-modifying procedure will change the code. The content of the TCB 224 that the procedure is stored in will be different, and consequently digital signature verification on the TCB will fail. The hypervisor 202 will not invoked the TCB, and in some embodiments the failure can be reported; e.g., to a system administrator.

In other embodiments, it may be possible that only certain procedures that modify the kernel would be installed in the TCB 224. For example, an administrative user or other authority may select to install only some kernel-modifying procedures in the TCB.

In some embodiments, rather that verifying the entire TCB 224, individual procedures stored in the TCB 224 can be associated with corresponding digital signatures. Only the procedure identified in the hyper call (e.g., via the procedure ID) need be verified. In this way, if only one procedure is attacked, the entire TCB need not be disabled so that any kernel-modifying procedures that are still valid can be invoked.

Figure 8:
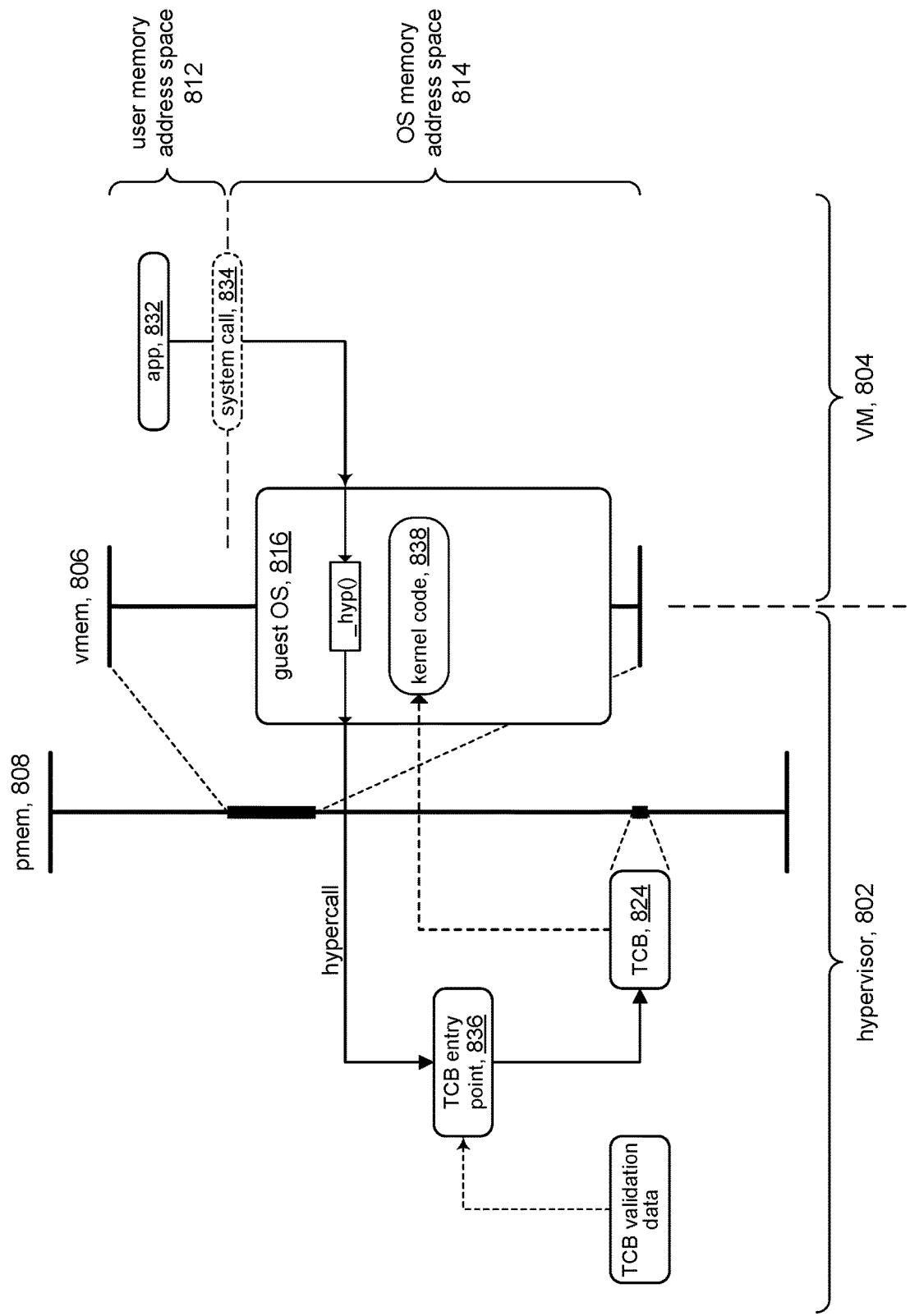
FIG. 8 represents an alternative configuration of a trusted computing base in accordance with some embodiments of the present disclosure.
Figure 9:
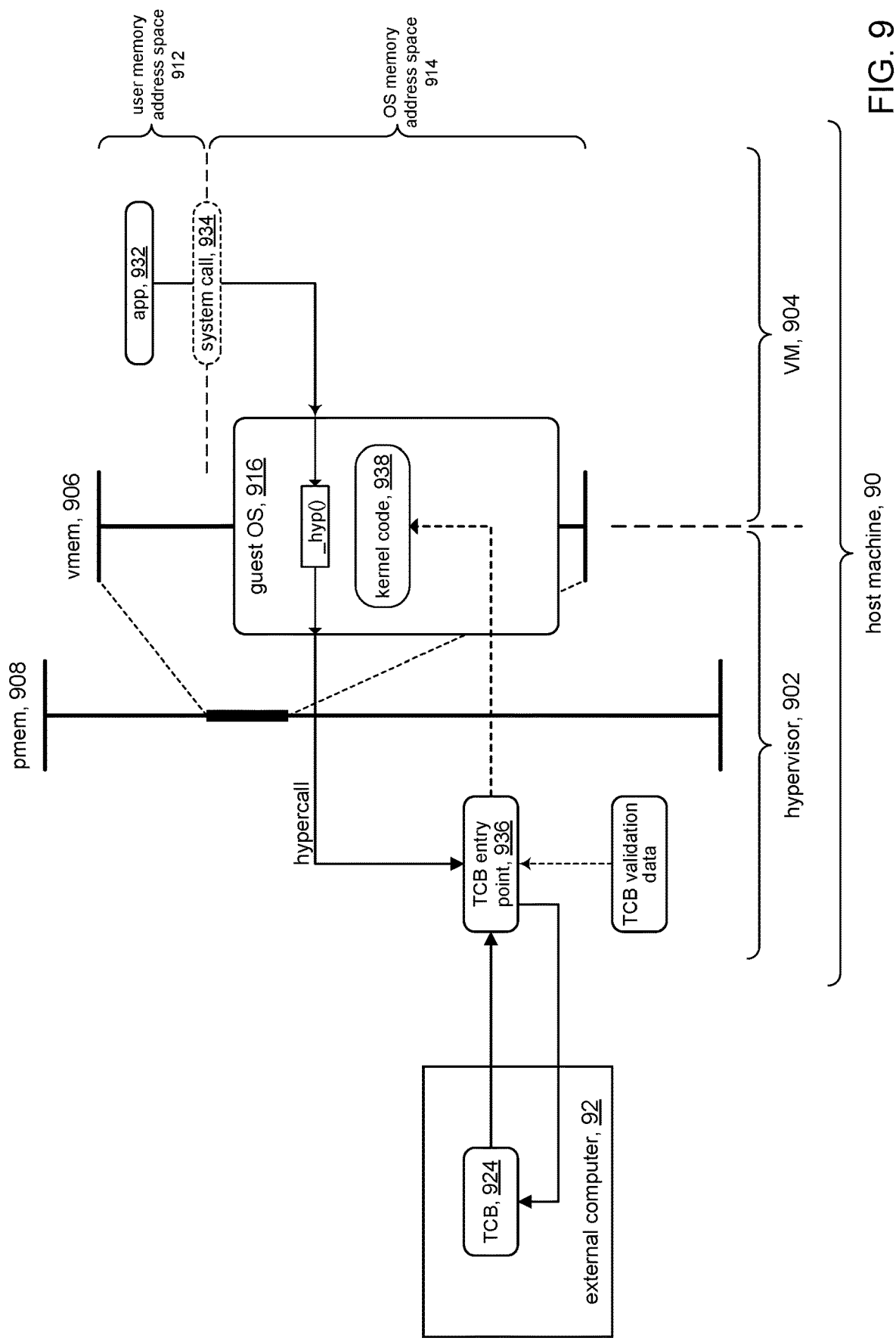
FIG. 9 represents another alternative configuration of a trusted computing base in accordance with some embodiments of the present disclosure.

Referring to FIGS. 8 and 9, the trusted computing base (TCB) can be provided outside the address space of the guest OS as compared to the configuration shown in FIG. 5, for example.

FIG. 8 shows an alternative configuration of the TCB in accordance with some embodiments of the present disclosure. The hypervisor 802 can instantiate a VM 804 that comprises virtual memory 806. The virtual memory 806 can be allocated from memory pages (not necessarily contiguously) of host physical memory 808 and is accessible by hypervisor 802 as well as the VM. The virtual memory 806 is partitioned into a user memory address space 812 and an OS memory address space 814. A guest OS 816 executes in the OS address space. In some embodiments, the TCB 824 can be allocated from the address space of the hypervisor 802, outside the address space of the VM 804. When an application 832 makes a system call 834 that involves modifying the kernel code, the TCB entry point module 836 can be invoked and the corresponding kernel-modifying procedure can be accessed from the TCB 824 as described above and executed by the hypervisor 802 to access/modify kernel code in the OS memory locations 838 in the guest OS 816. Since the TCB 824 exists outside the address space of the VM 804, the TCB is protected from modification attempts that originate from the VM. As such, in some embodiments, the TCB entry point module 836 may forego the validation check (e.g., operation 608, FIG. 6). It is appreciated, of course, that a software bug in a procedure in the TCB can still be exploited; for instance, if a code bug results in failure to check a signature or authenticate a user then the procedure is vulnerable with respect to that bug. However, procedures in the TCB are nonetheless protected from being modified from the VM 804, and if only those procedures are allowed to modify kernel code and the procedures are bug-free and uncompromised, we can assume the rest of the kernel is too.

FIG. 9 shows an alternative configuration of the TCB in accordance with some embodiments of the present disclosure. A host machine 90 can support the execution of hypervisor 902. The hypervisor 902 can instantiate a VM 904 comprising virtual memory 906. The virtual memory 906 can be allocated from memory pages (not necessarily contiguously) of host physical memory 908 and is accessible by hypervisor 902 as well as the VM. The virtual memory 906 is partitioned into a user memory address space 912 and an OS memory address space 914. A guest OS 916 executes in the OS address space. In some embodiments, the TCB 924 be provided from an external computer 92 that is separate from host machine 90. When an application 932 makes a system call 934 that involves modifying the kernel code, the TCB entry point module 936 can be invoked as described above. In response, the TCB entry point module 936 can communicate with the external computer 92 to access the kernel-modifying procedure stored in TCB 924. The accessed procedure can be invoked to access kernel code in OS memory locations 938. In some embodiments, for example, a temporary copy of the kernel-modifying procedure can be stored in and executed by the hypervisor 902 to access/modify OS memory locations 938 in the guest OS 916. The copy can then be deleted. Since the TCB 924 exists separately from the host machine 90 altogether, the TCB is protected from modification attempts that originate from the VM 904 or attacks that may originate from within the host machine 90. It is appreciated, of course, that a software bug in a procedure in the TCB can still be exploited; for instance, if a code bug results in failure to check a signature or authenticate a user then the procedure is vulnerable with respect to that bug. However, procedures in the TCB are nonetheless protected from modification, and if only those procedures are allowed to modify kernel code and the procedures are bug-free and uncompromised, we can assume the rest of the kernel is too.

Figure 10:
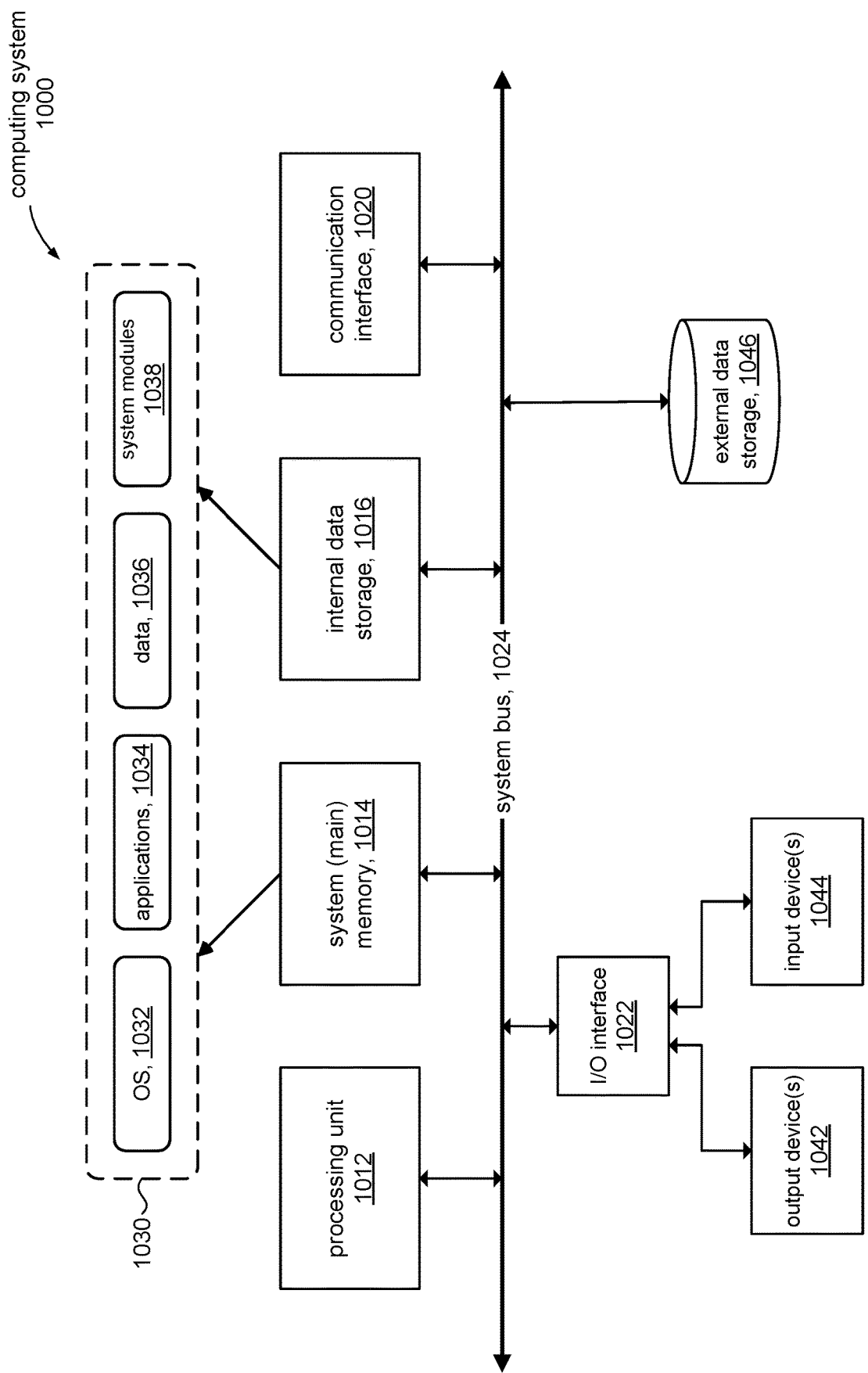
FIG. 10 represents an illustrative computer system that can be adapted in accordance with aspects of the present disclosure.

FIG. 10 is a simplified block diagram of an illustrative computing system 1000 for implementing one or more of the embodiments described herein (e.g., host machine 100, FIG. 1). The computing system 1000 can perform and/or be a means for performing, either alone or in combination with other elements, operations in accordance with the present disclosure. Computing system 1000 can also perform and/or be a means for performing any other steps, methods, or processes described herein.

Computing system 1000 can include any single- or multi-processor computing device or system capable of executing computer-readable instructions. Examples of computing system 1000 include, for example, workstations, laptops, servers, distributed computing systems, and the like. In a basic configuration, computing system 1000 can include at least one processing unit 1012 and a system (main) memory 1014.

Processing unit 1012 can comprise any type or form of processing unit capable of processing data or interpreting and executing instructions. The processing unit 1012 can be a single processor configuration in some embodiments, and in other embodiments can be a multi-processor architecture comprising one or more computer processors. In some embodiments, processing unit 1012 can receive instructions from program and data modules 1030. These instructions can cause processing unit 1012 to perform operations in accordance with the various disclosed embodiments (e.g., FIGS. 3, 6) of the present disclosure.

System memory 1014 (sometimes referred to as main memory) can be any type or form of storage device or storage medium capable of storing data and/or other computer-readable instructions, and comprises volatile memory and/or non-volatile memory. Examples of system memory 1014 include any suitable byte-addressable memory, for example, random access memory (RAM), read only memory (ROM), flash memory, or any other similar memory architecture. Although not required, in some embodiments computing system 1000 can include both a volatile memory unit (e.g., system memory 1014) and a non-volatile storage device (e.g., data storage 1016, 1046).

In some embodiments, computing system 1000 can include one or more components or elements in addition to processing unit 1012 and system memory 1014. For example, as illustrated in FIG. 10, computing system 1000 can include internal data storage 1016, a communication interface 1020, and an I/O interface 1022 interconnected via a system bus 1024. System bus 1024 can include any type or form of infrastructure capable of facilitating communication between one or more components comprising computing system 1000. Examples of system bus 1024 include, for example, a communication bus (such as an ISA, PCI, PCIe, or similar bus) and a network.

Internal data storage 1016 can comprise non-transitory computer-readable storage media to provide nonvolatile storage of data, data structures, computer-executable instructions, and so forth to operate computing system 1000 in accordance with the present disclosure. For instance, the internal data storage 1016 can store various program and data modules 1030, including for example, operating system 1032, one or more application programs 1034, program data 1036, and other program/system modules 1038 to implement structures comprising buffer tree 106 and to support and perform various processing and operations disclosed herein.

Communication interface 1020 can include any type or form of communication device or adapter capable of facilitating communication between computing system 1000 and one or more additional devices. For example, in some embodiments communication interface 1020 can facilitate communication between computing system 1000 and a private or public network including additional computing systems. Examples of communication interface 1020 include, for example, a wired network interface (such as a network interface card), a wireless network interface (such as a wireless network interface card), a modem, and any other suitable interface.

In some embodiments, communication interface 1020 can also represent a host adapter configured to facilitate communication between computing system 1000 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 1000 can also include at least one output device 1042 (e.g., a display) coupled to system bus 1024 via I/O interface 1022, for example, to provide access to an administrator. The output device 1042 can include any type or form of device capable of visual and/or audio presentation of information received from I/O interface 1022.

Computing system 1000 can also include at least one input device 1044 coupled to system bus 1024 via I/O interface 1022, e.g., for administrator access. Input device 1044 can include any type or form of input device capable of providing input, either computer or human generated, to computing system 1000. Examples of input device 1044 include, for example, a keyboard, a pointing device, a speech recognition device, or any other input device.

Computing system 1000 can also include external data storage subsystem 1046 coupled to system bus 1024. In some embodiments, the external data storage 1046 can be accessed via communication interface 1020. External data storage 1046 can be a storage subsystem comprising a storage area network (SAN), network attached storage (NAS), virtual SAN (VSAN), and the like. External data storage 1046 can comprise any type or form of block storage device or medium capable of storing data and/or other computer-readable instructions. For example, external data storage 1046 can be a magnetic disk drive (e.g., a so-called hard drive), a solid state drive, a floppy disk drive, a magnetic tape drive, an optical disk drive, a flash drive, or the like. In some embodiments, block storage subsystem 104 in FIG. 1 can comprise external data storage subsystem 1046.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
invoking an operating system procedure that is directed to modifying memory locations in an operating system memory, the memory locations storing kernel code of an operating system (OS);
in response to invoking the OS procedure, validating content of at least a portion of a protected memory that stores program code comprising a kernel-modifying procedure, wherein program code of the OS procedure is stored outside of the protected memory, and wherein the validating comprises comparing the content with a digital signature associated with the at least the portion of the protected memory; and
in response to a determination that the content of the at least the portion of the protected memory that stores the program code comprising the kernel-modifying procedure is deemed to be valid, causing the kernel-modifying procedure to execute, wherein execution of the kernel-modifying procedure includes executing the program code to cause modifying of the kernel code stored in the memory locations in the OS memory.

2. The method of claim 1, further comprising storing the program code comprising the kernel-modifying procedure in the protected memory based on bringing up of the OS.

3. The method of claim 1, wherein the kernel-modifying procedure is one procedure among a plurality of procedures that modify the kernel code.

4. The method of claim 1, wherein an address space of the kernel code is separate from an address space of the protected memory.

5. The method of claim 1, wherein the kernel code and the protected memory are on different computer systems.

6. The method of claim 1, wherein write operations on OS memory pages that contain the kernel code are disabled during initialization of the OS, the method further comprising:
enabling write operations on the OS memory pages prior to causing the kernel-modifying procedure to execute; and
disabling write operations on the OS memory pages subsequent to execution of the kernel-modifying procedure.

7. The method of claim 1, further comprising receiving a system call and in response to receiving the system call, invoking the OS procedure.

8. The method of claim 1, wherein the OS is a guest OS of a virtual machine, wherein the validating includes:
the guest OS invoking a hypervisor procedure in a hypervisor that instantiated the virtual machine; and
the hypervisor procedure validating the content of the at least the portion of the protected memory that stores the program code comprising the kernel-modifying procedure.

9. The method of claim 8, wherein causing the kernel-modifying procedure to execute includes the hypervisor procedure invoking the kernel-modifying procedure.

10. A non-transitory computer-readable storage medium having stored thereon computer executable instructions, which when executed by a computer device, cause the computer device to:
invoke an operating system procedure that is directed to modifying memory locations in an operating system memory, the memory locations storing kernel code of an operating system (OS);
in response to invoking the OS procedure, validating content of at least a portion of a protected memory that stores program code comprising a kernel-modifying procedure, wherein program code of the OS procedure is stored outside of the protected memory, and wherein the validating comprises comparing the content with a digital signature associated with the at least the portion of the protected memory; and
in response to a determination that the content of the at least the portion of the protected memory that stores the program code comprising the kernel-modifying procedure is deemed to be valid, causing the kernel-modifying procedure to execute, wherein execution of the kernel-modifying procedure includes executing the program code to cause modifying of the kernel code stored in the memory locations in the OS memory.

11. The non-transitory computer-readable storage medium of claim 10, wherein the computer executable instructions, which when executed by the computer device, further cause the computer device to store the program code comprising the kernel-modifying procedure in the protected memory based on bringing up of the OS.

12. The non-transitory computer-readable storage medium of claim 10, wherein an address space of the kernel code is separate from an address space of the protected memory.

13. The non-transitory computer-readable storage medium of claim 9, wherein the kernel code and the protected memory are on different computer systems.

14. The non-transitory computer-readable storage medium of claim 9, wherein write operations on OS memory pages that contain the kernel code are disabled during initialization of the OS, wherein the computer executable instructions, which when executed by the computer device, further cause the computer device to:
enable write operations on the OS memory pages prior to causing the kernel-modifying procedure to execute; and
disable write operations on the OS memory pages subsequent to execution of the kernel-modifying procedure.

15. The non-transitory computer-readable storage medium of claim 10, wherein the computer executable instructions, which when executed by the computer device, further cause the computer device to operate as a hypervisor to instantiate a virtual machine (VM) and bring up the OS as a guest OS on the VM, wherein the validating includes:
the guest OS invoking a hypervisor procedure in a hypervisor that instantiated the virtual machine; and
the hypervisor procedure validating the content of the at least the portion of the protected memory that stores the program code comprising the kernel-modifying procedure.

16. The non-transitory computer-readable storage medium of claim 15, wherein causing the kernel-modifying procedure to execute includes the hypervisor procedure invoking the kernel-modifying procedure.

17. An apparatus comprising:
one or more computer processors; and
a computer-readable storage medium comprising instructions for controlling the one or more computer processors to be operable to:

invoke an operating system procedure that is directed to modifying memory locations in an operating system memory, the memory locations storing kernel code of an operating system (OS);

in response to invoking the OS procedure, validating content of at least a portion of a protected memory that stores program code comprising a kernel-modifying procedure, wherein program code of the OS procedure is stored outside of the protected memory, and wherein the validating comprises comparing the content with a digital signature associated with the at least the portion of the protected memory; and in response to a determination that the content of the at least the portion of the protected memory that stores the program code comprising the kernel-modifying procedure is deemed to be valid, causing the kernel-modifying procedure to execute, wherein execution of the kernel-modifying procedure includes executing the program code to cause modifying of the kernel code stored in the memory locations in the OS memory.

18. The apparatus of claim 17, wherein the computer-readable storage medium further comprises instructions for controlling the one or more computer processors to be operable to store the program code comprising the kernel-modifying procedure in the protected memory based on bringing up of the OS.

19. The apparatus of claim 17, wherein an address space of the kernel code is separate from an address space of the protected memory.

20. The apparatus of claim 17, wherein the apparatus is a host machine that supports virtual machines, wherein the computer-readable storage medium further comprises instructions for controlling the one or more computer processors to operate as a hypervisor to instantiate a VM and bring up the OS as a guest OS on the VM, wherein the validating includes:

the guest OS invoking a hypervisor procedure in a hypervisor that instantiated the virtual machine; and the hypervisor procedure validating the content of the at least the portion of the protected memory that stores the program code comprising the kernel-modifying procedure.

* * * * *